United States Patent
Solvang

(10) Patent No.: US 11,388,512 B2
(45) Date of Patent: Jul. 12, 2022

(54) POSITIONING SOUND SOURCES

(71) Applicant: Nomono AS, Trondheim (NO)

(72) Inventor: Audun Solvang, Trondheim (NO)

(73) Assignee: NOMONO AS, Trondheim (NO)

( * ) Notice: Subject to any disclaimer, the term of this patent is extended or adjusted under 35 U.S.C. 154(b) by 0 days.

(21) Appl. No.: 16/971,630

(22) PCT Filed: Feb. 22, 2019

(86) PCT No.: PCT/GB2019/050497
§ 371 (c)(1),
(2) Date: Aug. 20, 2020

(87) PCT Pub. No.: WO2019/162690
PCT Pub. Date: Aug. 29, 2019

(65) Prior Publication Data
US 2020/0396537 A1    Dec. 17, 2020

Related U.S. Application Data

(60) Provisional application No. 62/633,755, filed on Feb. 22, 2018.

(30) Foreign Application Priority Data

Feb. 22, 2018    (GB) ...................................... 1802850

(51) Int. Cl.
*H04R 3/00* (2006.01)
*G06T 7/20* (2017.01)
(Continued)

(52) U.S. Cl.
CPC ............... *H04R 3/005* (2013.01); *G06T 7/20* (2013.01); *H04R 1/406* (2013.01); *H04R 5/027* (2013.01);
(Continued)

(58) Field of Classification Search
CPC ........ H04R 3/005; H04R 1/406; H04R 5/027; H04R 29/005; H04S 3/008; H04S 7/30;
(Continued)

(56) References Cited

U.S. PATENT DOCUMENTS 7,952,962 B2    5/2011  Walley et al.
8,155,331 B2    4/2012  Nakadai et al.
(Continued)

FOREIGN PATENT DOCUMENTS

EP    3248387 A1    11/2017
GB    2540224 A     1/2017
(Continued)

OTHER PUBLICATIONS

Hasan Khaddour, Jiří Schimmel, and Michal Trzos; Estimation of Direction of Arrival of Multiple Sound Sources in 3D Space Using B B-Format; International Journal of Advances in Telecommunications, Electrotechnics, Signals and Systems; vol. 2, No. 2 (2013); pp. 63-68.

(Continued)

*Primary Examiner* — William A Jerez Lora
(74) *Attorney, Agent, or Firm* — ArentFox Schiff LLP

(57) ABSTRACT

A method of determining a position of a sound source is provided which comprises generating a spatially encoded sound-field signal using a sound-field microphone system comprising at least two microphones, wherein the spatially encoded sound-field signal comprises a plurality of components, each component including sound from the sound source. The method further comprises generating a local microphone signal corresponding to sound from the sound source using a local microphone positioned close to the sound source, comparing the local microphone signal with each of the plurality of components to generate a plurality of comparison results and using the plurality of comparison (Continued)

results to determine the position of the sound source relative to the sound-field microphone system.

20 Claims, 4 Drawing Sheets

(51) Int. Cl.
| | | |
|---|---|---|
| H04R 1/40 | (2006.01) | |
| H04R 5/027 | (2006.01) | |
| H04R 29/00 | (2006.01) | |
| H04S 3/00 | (2006.01) | |
| H04S 7/00 | (2006.01) | |

(52) U.S. Cl.
CPC ........... *H04R 29/005* (2013.01); *H04S 3/008* (2013.01); *H04S 7/30* (2013.01); *G06T 2207/10016* (2013.01); *H04S 2400/01* (2013.01); *H04S 2400/15* (2013.01)

(58) Field of Classification Search
CPC ... H04S 2400/01; H04S 2400/15; G06T 7/20; G06T 2207/10016
USPC .............................................. 381/56, 58, 92
See application file for complete search history.

(56) References Cited

U.S. PATENT DOCUMENTS

| | | | |
|---|---|---|---|
| 8,184,843 B2 | 5/2012 | Kim | |
| 8,842,851 B2 | 9/2014 | Beaucoup | |
| 8,983,089 B1 | 3/2015 | Chu et al. | |
| 9,129,223 B1 | 9/2015 | Velusamy et al. | |
| 9,430,931 B1* | 8/2016 | Liu | G08B 21/24 |
| 9,489,948 B1 | 11/2016 | Chu et al. | |
| 9,560,446 B1 | 1/2017 | Chang et al. | |
| 2004/0131196 A1* | 7/2004 | Malham | H04S 3/00 381/61 |
| 2009/0112476 A1* | 4/2009 | Parker | G01V 1/001 702/6 |
| 2012/0069242 A1* | 3/2012 | Pearlstein | G10K 11/17827 348/484 |
| 2012/0263020 A1 | 10/2012 | Taylor et al. | |
| 2014/0267704 A1 | 9/2014 | Huang et al. | |
| 2015/0049892 A1* | 2/2015 | Petersen | H04R 25/554 381/315 |
| 2016/0021474 A1* | 1/2016 | Matsumoto | H04R 1/406 381/56 |
| 2016/0227337 A1* | 8/2016 | Goodwin | G10L 19/008 |
| 2017/0353789 A1 | 12/2017 | Kim et al. | |
| 2018/0109873 A1 | 4/2018 | Xiang et al. | |
| 2018/0199137 A1 | 7/2018 | Mate et al. | |

FOREIGN PATENT DOCUMENTS

| | | |
|---|---|---|
| GB | 2543275 A | 4/2017 |
| WO | 2018002428 A1 | 1/2018 |

OTHER PUBLICATIONS

Nils Peters, Jonas Braasch and Stephen McAdams; Sound spatialization across disciplines using virtual microphone control (ViMiC); journal of interdisciplinary music studies season 2011, vol. 5, issue 2, art. #11050203, pp. 167-190.

Audun Solvang; Camera mounted Ultrasonic system for Positioning microphones in Spatial Audio; SINTEF; pp. 1-8.

Jonas Braasch;Wieslaw Woszczyk; A "Tonmeister" Approach To the Positioning of Sound Sources in a Multichannel Audio System; 2005 IEEE Workshop on Applications of Signal Processing to Audio and Acoustics; Oct. 16-19, 2005; pp. 130-133.

Jonas Braasch; A Virtual Auditory Display for Telematic Music Performances; International Workshop on the Prinicples and Applications of Spatial Hearing; pp. 1-5.

Jonas Braasch and Nicholas Tranby; A Sound-Source Tracking Device To Track Multiple Talkers From Microphone Array and Lavalier Microphone Data; 19th International Congress On Acoustics Madrid, Sep. 2-7, 2007; pp. 1-6.

Juha Merimaa; Applications of a 3-D Microphone Array; Audio Engineering Society Convention Paper 5501; Helsinki University of Technology, Lab. of Acoustics and Audio Signal Processing, P.O. Box 3000, FIN-02015, HUT, Finland pp. 1-11.

Mati Wax and Thomas Kailath; Optimum Localization of Multiple Sources by Passive Arrays; IEEE Transactions on Acoustics, Speech, and Signal Processing, vol. ASSP-31, No. 5, Oct. 1983; pp. 1210-1217.

International Search Report issued in corresponding International Application No. PCT/GB2019/050497 dated Apr. 8, 2019.

International Search Report issued in corresponding International Application No. PCT/GB2019/050497 dated Aug. 4, 2019.

\* cited by examiner

POSITIONING SOUND SOURCES

This application is a 35 U.S.C. § 371 National Phase of PCT Application No. PCT/GB2019/050497, filed Feb. 22, 2019, which claims priority to Great Britain Application No. 1802850.6, filed Feb. 22, 2018 and U.S. Provisional Application No. 62/633,755, filed Feb. 22, 2018, the disclosures of which are hereby incorporated by reference herein.

TECHNICAL FIELD

The present application relates to sound field recording systems, particularly, although not exclusively, those suited for use in spatial audio content or virtual reality productions.

BACKGROUND

Sound-field, or spatial audio systems and formats (e.g. ambisonics, Dolby Atmos™, Auro-3D™, DTS:X™) provide a method of storing spatially encoded sound information relating to a given sound scene. In other words they provide a way of assigning position information to sound sources within a sound scene. The spatially encoded sound information (or "sound-field") can be produced using separately recorded soundtracks to which positional information is manually ascribed (e.g. when creating a computer generated video game sound scene) or, alternatively, can be captured entirely live, using e.g. a multidirectional ambisonic microphone. Capturing live "sound-field" data has been typically used to make conventional sound recordings more immersive (e.g. by creating the illusion of sitting amongst an orchestra), but more recently the technology has begun to be applied to virtual reality productions.

Virtual reality (VR) productions typically comprise a 360° stereo video signal and a corresponding soundtrack. These productions are played back to users on platforms supporting first-person view in order to produce the sensation of presence. Examples of such platforms are binocular headset and stereo headphones, desktop 360 video players and 360 cinema. Binocular headsets are typically able to track the position and orientation of a user's head (using e.g. an IMU/accelerometer), so that the video and audio played back to the headset and headphones respectively can be adjusted accordingly to maintain the virtual reality illusion. For example, at a given moment, only a portion of the 360° video signal is displayed to a user, corresponding to the user's current field of view in the virtual environment. When the user moves or turns their head, the portion of the 360° signal displayed to the user changes to reflect how this movement would change a user's view in the virtual world. Similarly, sounds emanating from different locations in a virtual scene may be subject to adaptive filtering of the left and right headphone channels when a user moves, to emulate the frequency dependent phase and amplitude alteration of the sound that happens in real life due to the spatial offset between the ears and human head and upper body scattering.

Some VR productions consist entirely of computer generated imagery and separately pre-recorded or synthesised sounds. However, it is becoming increasingly popular to produce "live action" VR recordings, using cameras capable of recording a 360° field of view and sound-field microphones which can record a spatially encoded soundtrack. The recorded sound and video is then processed to produce a VR recording that is capable of being played back via a headset and headphones as described above.

Using a sound field microphone system to record the VR soundtrack allows the recorded sound to be easily implemented into VR applications, as the recorded sound is natively encoded with spatial information. The recorded video and sound signals need only to be "aligned" to produce the final VR recording, ready for playback via a system as described above. Many commercially available video production tools and computer software applications already contain VR production features, including the ability to incorporate spatially encoded audio files into the production.

Spatial audio microphones, whilst a useful tool for capturing live sound field information from a particular point in space, do have some limitations in terms of the quality and flexibility of their output. The sound quality of, for example, a person positioned a large distance away from the microphone may be significantly diminished. It is also difficult to isolate a single sound source within a sound field recording for the purposes of adding effects or adjusting levels. The present application seeks to mitigate at least some of these problems.

SUMMARY

From a first aspect the invention provides a method of determining a position of a sound source comprising:
generating a spatially encoded sound-field signal using a sound-field microphone system comprising at least two microphones, wherein the spatially encoded sound-field signal comprises a plurality of components, each component including sound from the sound source;
generating a local microphone signal corresponding to sound from the sound source using a local microphone positioned close to the sound source;
comparing the local microphone signal with each of the plurality of components to generate a plurality of comparison results; and
using the plurality of comparison results to determine the position of the sound source relative to the sound-field microphone system.

Thus it will be seen by those skilled in the art that, in accordance with the invention, local microphone signals, which may produce greater sound quality and/or isolation, can be easily used and integrated with a sound-field microphone signal.

The present invention can thus facilitate high quality, accurate and immersive spatial audio recordings or live broadcasts including audio-only productions (e.g. musical or dramatic performances, spoken word productions, radio broadcasts, podcasts, etc.).

Furthermore, in conventional sound and video productions a sound source distant to the camera might be captured with a close microphone (e.g. a lavalier-type microphone clipped to a person's clothing), in order to improve the sound quality and level of isolation. The resulting sound signal can be incorporated with the video feed by synchronising the timing of the two (often achieved by connecting the recording equipment to a timecode and sync generator providing the units with the same word clock and time code), however this approach is not so easily applied to VR productions. While synchronising the timing of video and audio tracks may be relatively simple, positioning the sound within the VR world such that it appears to emanate from a particular direction within the video feed requires additional information regarding the location of the sound source. This process is further complicated if the sound source is moving and/or is partially or fully hidden from view of the camera during part or the entire scene.

One technique that may be used to position the sound source is manual tracking, whereby, during post production, a user watches back the video recording, and manually traces the position and/or path of a sound source. The close microphone recording of the sound source is then assigned to the manually traced position/movement and the final VR production with correct spatial audio can then be produced. This approach however is highly labour intensive, can be inaccurate and is also only possible with sound sources that are visible to the camera. Furthermore it is effectively restricted to locating the source in two dimensions. Distance information may also have to be estimated and/or set to a constant value. All of these issues lead to less accurate sound field reproduction in a final VR soundtrack and a less immersive VR experience. This approach is not applicable at all to audio-only productions where no video recording is available.

A typical live-action scene may contain tens or hundreds of individual sound sources. Whilst providing each of the sound sources of interest with individual close microphones would be beneficial for reasons of isolation and sound quality, for the reasons given above this would require a lot of additional production resources and time.

By contrast, because in accordance with the invention sound from the sound source will be detected by both the close microphone and the sound field microphone system (although at a lower intensity and quality) the Applicant has appreciated that it is possible, using the plurality of comparison results, to determine the position of the sound source relative to the sound-field microphone system. This means that a user (e.g. a producer) does not have to manually position the sound source using slow and imprecise techniques. Instead the position of the sound source may be determined automatically, with minimal user input. This approach has the additional advantages of the possibility of greater accuracy and the ability to use it in audio-only productions or with sound sources that are not discernible to the camera (e.g. during low-light or dark scenes, or when the sound source is contained in, but is not distinguishable from, a larger object).

The local microphone signal is typically assumed to represent accurately the sound produced by the sound source, and the local microphone preferably placed as close as possible to the sound source, so that determining the position of the sound source is effectively equivalent to determining the position of the local microphone.

The term "spatially encoded" is used herein to refer to data from which position information can be determined. This may comprise explicit position metadata stored alongside sound data, but should also understood to encompass data from which position information is recoverable, e.g. the known positions and/or directivity of microphones alongside sound data from said microphones. Examples of spatially encoded sound signals include ambisonic A or B formats.

The sound-field microphone system may comprise any arrangement of microphones from which a spatially encoded sound-field signal may be generated, for example a planar array, an orthogonal array or more complex arrangements.

While the Applicant recognises that unambiguously determining position information in three dimensions may theoretically require the sound-field microphone system to comprise four or more microphones, the Applicant has appreciated that in many situations only two microphones may be sufficient to determine position sufficiently accurately. For example, additional information such as known physical limits to the position or movement of the sound source, or a known starting position in conjunction with tracking techniques may be used to help resolve the position of the sound source. However in a set of embodiments the sound-field microphone system comprises at least three microphones, and in some such embodiments the sound-field microphone system comprises at least four microphones.

In a set of embodiments the sound-field microphone system also comprises a processing module. The processing module may be configured to encode the outputs of the plurality of microphones with position data.

Preferably, the at least two microphones of the sound-field microphone system are adjacent each other, although in general they could be spaced apart from each other. The sound-field microphone system may comprise a plurality of microphones arranged mutually orthogonally, that is the respective axes for each microphone which have the greatest response are mutually orthogonal to one another.

In some sets of embodiments, comparing the local microphone signal with each of the plurality of components comprises determining a measure of correlation between the local microphone signal and each of the plurality of components. Any suitable measure of correlation may be used but in a set of embodiments the measure of correlation comprises a cross spectrum between the local microphone signal and each of a plurality of components of the spatially encoded sound-field signal. In some such embodiments the local microphone signal and the spatially encoded sound-field signal are pre-processed before the measure of correlation is determined. For example the local microphone signal and each of the plurality of components may be Fourier transformed.

In some embodiments, each of the plurality of components of the spatially encoded sound-field signal consists simply of an output from one of the microphones. In such embodiments, the positions and orientations of each of the microphones is typically known, from which spatial encoding can be achieved. In some such embodiments the spatially encoded sound-field signal comprises a set of ambisonic A-format signals.

In some such embodiments, the determined measures of correlation may be used to calculate one or more propagation delays between the local microphone signal and at least one of the plurality of components (e.g. propagation delays between the local microphone signal and each of the plurality of components). In such embodiments, determining the position of the sound source relative to the sound-field microphone system may comprise determining a direction from the sound-field microphone system to the local microphone using differences between two or more of the propagation delays.

As the position of each of the microphones is known, these calculated propagation delays may be used, along with an estimate of the speed of sound, to determine distances from the sound source to each of the microphones. By identifying the point at which these distances coincide, the location of the sound source may be determined. This "trilateration" method relies upon the difference between the determined distances being greater than the uncertainty on the individual range measurements. As a result this method is particularly suited to sound-field microphone systems in which the microphones are spaced reasonably far apart, in order to generate a greater difference in determined distances between respective microphones and the sound source.

Calculating the propagation delay between the local microphone signal and each of the plurality of components may comprise calculating the cross correlation of each of the determined measures of correlation (e.g. each of the cross spectra).

Determining the position of the sound source relative to the sound-field microphone system may comprise determining a distance from the sound-field microphone system to the local microphone using at least one of the propagation delays, for example an average of the propagation delays, along with an estimate of the speed of sound to determine the distance from the sound-field microphone system to the local microphone.

Provided that there is sufficient temporal synchronization between each of the plurality of components and the local microphone signal, the distance range between each transmitter and the microphone may be measured with a high precision (e.g. to a few cm).

Even in scenarios where temporal synchronization between each of the plurality of components and the local microphone signal is inaccurate or unavailable, it may still be possible to determine the change in distance from the sound-field microphone system to the local microphone over time, which may be used to determine the position of the sound source relative to the sound-field microphone system, for example by combining it with a known initial position of the sound source.

In alternative embodiments, outputs from the at least two microphones are processed to produce the spatially encoded sound-field signal. This may involve combining the outputs from the microphone signals to produce the plurality of components. In such embodiments, each of the plurality of components may correspond to a virtual microphone output with a specified position, orientation and region of sensitivity. For example, each of the plurality of components may correspond to a microphone having a region of sensitivity corresponding to one of the spherical harmonic functions. In a set of embodiments the spatially encoded sound-field signal comprises a set of ambisonic B-format signals. In some such embodiments, the sound-field microphone system comprises a microphone array and an encoder. The encoder may be arranged to process outputs from the microphone array to produce the spatially encoded sound-field signal.

In some such embodiments, the determined measures of correlation are used to calculate a direction and range from the sound-field microphone system to the sound source. As above, the B-format signals and the local microphone signal may be Fourier transformed, and the measure of correlation may comprise a cross spectrum between the local microphone signal and each of the plurality of components.

The calculated cross spectrum between the local microphone signal and each of the plurality of components may be used to determine the impulse response of the environment including the sound source and the microphones. A time window may then be applied to this impulse response to extract the direct sound weighted by the spherical harmonics. The weight of each of the spherical harmonic components may be used to extract the azimuth and elevation (i.e. the direction) of the sound source.

In some embodiments the measures of correlation may be used to determine a direct sound autocorrelation weighted by the spherical harmonics. In such embodiments the direction from the sound-field microphone system to the local microphone may be extracted by evaluating the components of the direct sound autocorrelation.

The range from the sound source to the sound-field microphone system may be calculated by examining the zero-th order component of the impulse response (i.e. the 0, 0 spherical harmonic) and extracting a propagation delay between the local microphone signal and the spatially encoded sound-signal. The range from the sound source to the sound-field microphone system may then be calculated by multiplying the propagation delay by an estimate of the speed of sound. Combining this calculated range with the determined direction of the sound source fully defines the position of the sound source. The propagation delay can also be used for aligning the time window used for extracting the direct sound when determining the azimuth and elevation from the relative weight of the first order spherical harmonics components.

As will be appreciated from the above, in many embodiments of the present invention the speed of sound must be estimated to a high precision in order to accurately determine the position of the sound source relative to the sound-field microphone system. In some embodiments, therefore, an ambient temperature measurement is used to calculate or refine an estimate of the speed of sound used in determining the position of the sound source.

As mentioned above, in VR productions sources of sound often move around the scene. The present invention may be particularly applicable in scenarios in which the sound source comprises a moving sound source, as it can mitigate the requirement for labour intensive manual tracking of moving sound sources during production.

In embodiments featuring a moving sound source, the local microphone is preferably configured to move with the sound source, to ensure that it continues to generate a local microphone signal corresponding to sound from the sound source. This may be achieved by affixing or otherwise connecting the local microphone to the sound source. For example the sound source may comprise a talking person, and the local microphone may comprise a lavalier microphone clipped to an item of the person's clothing.

The Applicant has appreciated that the positioning technique disclosed herein can also be applied to scenarios in which there is more than one sound source of interest. As mentioned above, in productions featuring multiple sound sources, manually tracking the position of each can be highly labour intensive. In some embodiments therefore, each of the plurality of components includes sound from a second sound source, and the method further comprises:

capturing a second microphone signal using a second microphone positioned close to the second sound source, wherein the first microphone signal comprises sound from the second sound source;

comparing the second microphone signal with each of the plurality of components to generate a plurality of second comparison results; and using the plurality of second comparison results to determine the position of the second sound source relative to the sound-field microphone system.

The position of the sound source determined using the method described herein has a number of different applications. In some embodiments the method further comprises producing a spatially encoded soundtrack wherein the local microphone signal is encoded with the position of the sound source relative to the sound-field microphone system. This enables accurate, immersive playback for a user without requiring the additional workload associated with manually tracking sound sources during production.

The Applicant has also appreciated that in some embodiments the position may advantageously be used to control a further action. The position may be determined in real-time, in which the position is determined while the spatially encoded sound-field signal and local microphone signal are being generated. In some such embodiments the position of the sound source may be used, for example, to trigger sound effects, camera movements and/or lighting changes automatically.

In some embodiments the position of the sound source may be used to trigger and/or control sound effects or sound processing techniques such as: gain level and/or automatic gain control (AGC), compressors, mixing, delay and reverb including dry-wet mix, filtering including equalizing, tremolo, modulations, chorus, flangers, wah-wah, phasers, time stretching and pitch shift, noise reduction and restoration, vocoding, autotune and sound synthesis.

Such sound effects or processing techniques may be applied to and/or executed on diegetic or non-diegetic sound signals. The sound effects and/or processing techniques may be applied to and/or executed on the sound emitted by the sound source subject to positioning, although they may also or instead be applied to sound emitted from other sound sources.

The sound effects and processing may be mono or they may be spatial. As mentioned above, the present invention is particularly suited for use within virtual reality (VR) productions which comprise video along with a corresponding soundtrack. In some sets of embodiments therefore, the method further comprises capturing a video signal using a camera system, wherein the sound source is captured within the video signal. The video signal may comprise a 360° video signal.

The position of the sound source may also be used to trigger and/or control video effects or processing techniques such as reframing, filters, text and subtitles or computer generated imagery (CGI).

In some such embodiments, the sound-field microphone system is collocated with the camera system. The sound-field microphone system and the camera system may be provided as part of a single video and sound recording device to provide a convenient VR production solution for an end user. In an alternative embodiment however the sound-field microphone system may be provided separately to (i.e. not collocated with) the camera system.

In either of these embodiments, the method may further comprise using optical image tracking techniques within the video signal to determine and refine the position of the sound source. This may be automated, although it may require some user input. By combining two independent positioning techniques, uncertainty in the determined position may be reduced. An estimate of the speed of sound used in determining the position of the sound source may be refined by estimating positioning bias using optical object tracking within the video signal.

In embodiments where the sound-field microphone is provided separately, optical image tracking techniques within the video signal may be used to align the spatially encoded sound-field signal and the video signal.

In embodiments where the sound-field microphone and the camera systems are spaced apart, a spatial orientation of the two systems may be misaligned. By combining two independent positioning techniques the spatial orientation of the two systems may be aligned.

In some embodiments, comparing the local microphone signal with each of the plurality of components comprises inputting the local microphone signal and each of the plurality of components to a neural network and receiving the position of the sound source relative to the sound-field microphone system as an output from said neural network. In some such embodiments, the neural network is trained using previously captured local microphone signals, spatially encoded sound-field signals and information regarding sound source positions.

It will be appreciated by those skilled in the art that the methods described herein for determining positions of sound sources could be employed as part of a system which captures the respective signals on which the methods are performed. However this is not essential and they could equally be performed on signals previously captured or captured elsewhere. Thus when viewed from a second aspect, the invention provides a method of determining a position of a sound source comprising:

providing a spatially encoded sound-field signal comprising a plurality of components, each component including sound from the sound source;

providing a local microphone signal corresponding to sound from the sound source;

comparing the local microphone signal with each of the plurality of components to generate a plurality of comparison results; and using the plurality of comparison results to determine the position of the sound source.

The second aspect of the invention extends to a computer software tool/a non-transitory computer readable medium comprising software configured to:

receive a spatially encoded sound-field signal comprising a plurality of components, each component including sound from a sound source;

receive a local microphone signal corresponding to sound from the sound source;

compare the local microphone signal with each of the plurality of components to generate a plurality of comparison results; and use the plurality of comparison results to determine a position of the sound source.

It will be appreciated that many of the embodiments of the method of the first aspect of the invention are also embodiments of the method/software of the second aspect set out above. For example the method/software of the second aspect set out above could comprise providing data for generating a spatially encoded soundtrack or a control signal for controlling a further action such as sound effects, camera movements and/or lighting changes.

The invention also extends in general to apparatus configured to carry out the methods described herein, for example a sound source positioning system comprising:

a sound-field microphone system which is arranged to output a sound-field signal comprising a plurality of components, each component including sound from a sound source;

a close microphone which is positioned close to the sound source and is arranged to output a close microphone signal corresponding to sound from the sound source; and a processor arranged to receive the close microphone signal and the sound-field signal;

wherein the processor is configured to compare the close microphone signal with each of the plurality of components to generate a plurality of comparison results and to use the plurality of comparison results to determine a position of the sound source relative to the sound-field microphone system.

DETAILED DESCRIPTION

Certain embodiments of the invention will now be described, by way of example only, and with reference to the accompanying figures, in which.

Figure 1:
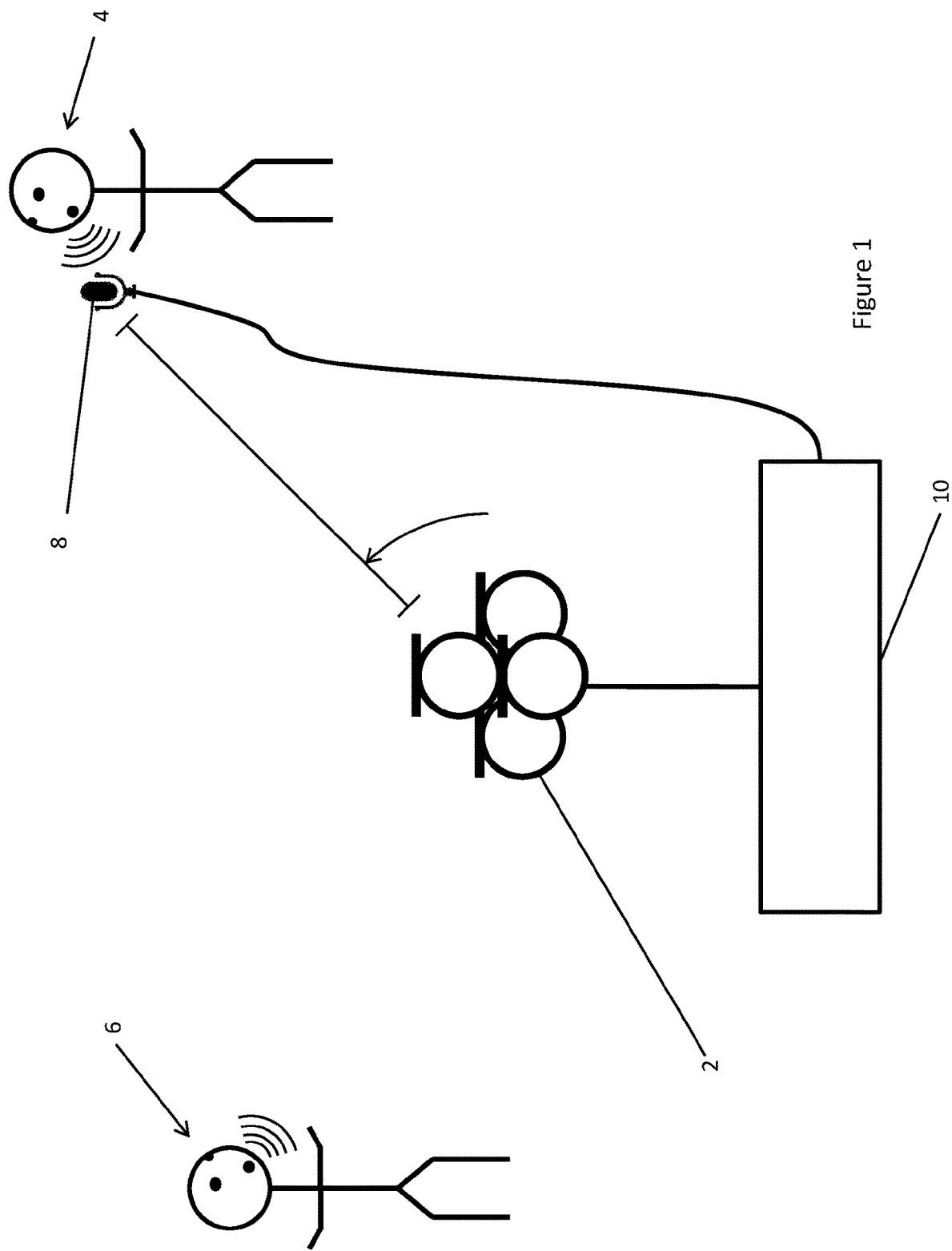
FIG. 1 is a schematic diagram of a sound field recording system operated according to an embodiment of the present invention.

FIG. 1 shows a scene from a virtual reality production featuring a sound-field microphone array 2 (e.g. an ambisonic microphone) along with a first person 4 and a second person 6. Although not shown in FIG. 1, the microphone array 2 comprises a plurality of microphones arranged to capture sound arriving at the microphone array 2 from any direction. The position and orientation of each of the plurality of microphones is precisely chosen in advance. The microphone array 2 is configured to output a plurality of sound signals to a processing module 10.

Due to the distance between the sound-field microphone array 2 and the first person 4 and the consequently reduced signal-to-noise ratio, the sound quality with which speech from the first person is recorded may not be adequate for the particular application.

In order to increase the sound quality of the first person's speech on the resultant sound-track, a local microphone 8 is positioned close to the first person 4. This could be e.g. a discreet lavalier-type microphone affixed to an item of clothing or a directional boom microphone placed just out of shot. The local microphone 8 outputs a single (mono) local microphone signal which is passed to the processing module 10.

Although physical connections are shown between the microphones 2, 8 and the processing module 10, wireless—e.g. radio frequency—connections could equally be provided for one or both of them.

Because the local microphone 8 is positioned so close to the first person 4, a high signal-to-noise ratio can be achieved and the signal therefrom is dominated by sound from the first person 4.

As depicted in FIG. 1, the first person 4 is speaking and thereby acts as a sound source within the scene. The second person 6 is also talking, and acts as another sound source. The sound created by both the first person 4 and the second person 6 is captured by the microphone array 2. As a result, the plurality of sound signals outputted by the microphone array 2 represent sound from both the first and second persons 4, 6.

The system shown here is able to produce a conventional spatially-encoded sound track comprising sound from both the first person 4 and the second person 6 which is captured by the microphone array 2. Specifically the processing module 10 uses the plurality of signals from the microphone array 2, along with the known positions and orientations of the individual microphones, to create a spatially encoded sound-field signal comprising a plurality of components, each component including sound from the first person 4 and the second person 6.

In accordance with the invention however, the higher quality signal from the local microphone 8 can also be incorporated into the spatially-encoded sound track.

In order to do this the position of the first person 4 relative to the sound field microphone array 2 must be determined. The processing module 10 does this by comparing the signal from the local microphone 8 with each of the plurality of components from the microphone array 2 to generate a plurality of comparison results.

As well as, or alternatively to, incorporating the higher quality signal from the local microphone 8 into the spatially-encoded sound track, the position of the first person 4 relative to the sound field microphone array 2 may be used to trigger further actions during or after production, for example controlling the application of sound effects or automatic sound level control.

There are several methods by which the processing module 10 may determine the position of the first person 4 (i.e. a sound source), two of which are described in detail for a general case below. While the processing module 10 is shown in FIG. 1 as being physically located nearby and connected to the microphone array 2 and the local microphone 8, the processing module 10 may be located remotely, for example provided on a remote server.

The processing module 10 may be used to determine the position of the first person 4 in "real time" while sound capture is on-going, enabling further actions, for example those discussed above, to be triggered during production. Alternatively however the determination of position may be carried out at a later time, e.g. during post production.

A general case of the scenario described in FIG. 1 is used to describe two distinct positioning approaches.

In the first approach, a microphone array consists of q microphones, and outputs a set of ambisonic A-format signals (i.e. the raw output from each microphone) $\hat{s}_q(t)$ each signal including sound from a sound source. A local microphone captures a local microphone signal $s_s(t)$ which corresponds to sound from the sound source.

If it is assumed that the A-format signals consist of I independent sound sources located in a room with reflective walls, the signal of the q-th microphone can be expressed as:

$$\hat{s}_q(t) = \sum_{i=1}^{I} s_i(t) \times h_{i,q}(t) + n_q(t),$$

where $n_q(t)$ is noise, and $h_{i,q}(t)$ is the room impulse response between the i-th source and the q-th microphone. The room impulse response is assumed to consist of L delayed reflections such that:

$$h_{i,q}(t) = \sum_{l=1}^{L} h_{i,q,l} \delta(t - \Delta t_{i,q,l}).$$

In the discrete time-frequency Fourier domain, the signal of the q-th microphone at time T can be expressed as:

$$\hat{S}_{q,T}(k) = \sum_{n=0}^{N-1} \hat{s}_q\left(\frac{n}{F_s} + T\right) e^{\frac{-i2\pi kn}{N}} = \sum_{i=1}^{I} S_{i,T}(k) H_{i,q,T}(k) + N_{q,T}(k).$$

$F_s$ is the sampling frequency. The subscript T is omitted for the rest of the description for readability. In order to estimate the position an estimate is made of the time of arrival of the direct sound $\Delta t_{i,q,1}$. The PHAse Transform (PHAT) algorithm is employed on the local microphone signal $S_s(k)$ and the A-format signals $\hat{S}_q(k)$:

$$\Delta t_{s,q,1} = \frac{1}{F_s} \underset{n}{\mathrm{argmax}} \sum_{k=0}^{N-1} e^{i\left(\varphi_{s,q}(k) + \frac{2\pi k n}{N}\right)}$$

$$\varphi_{s,q}(k) = \angle E\{\hat{S}_q(k)S_s(k)^*\} =$$

$$\angle E\left\{\sum_{i=1}^{I} S_i(k)S_s(k)H_{i,q}(k) + N_q(k)S_s(k)^*\right\} \approx \angle H_{s,q}(k)E\{S_s(k)S_s(k)^*\} =$$

$$\angle H_{s,q}(k)$$

The distance from microphone q to source s, equal to $r_s = c\Delta t_{s,q,1}$, can therefore be estimated, where c is the speed of sound.

Figure 2:
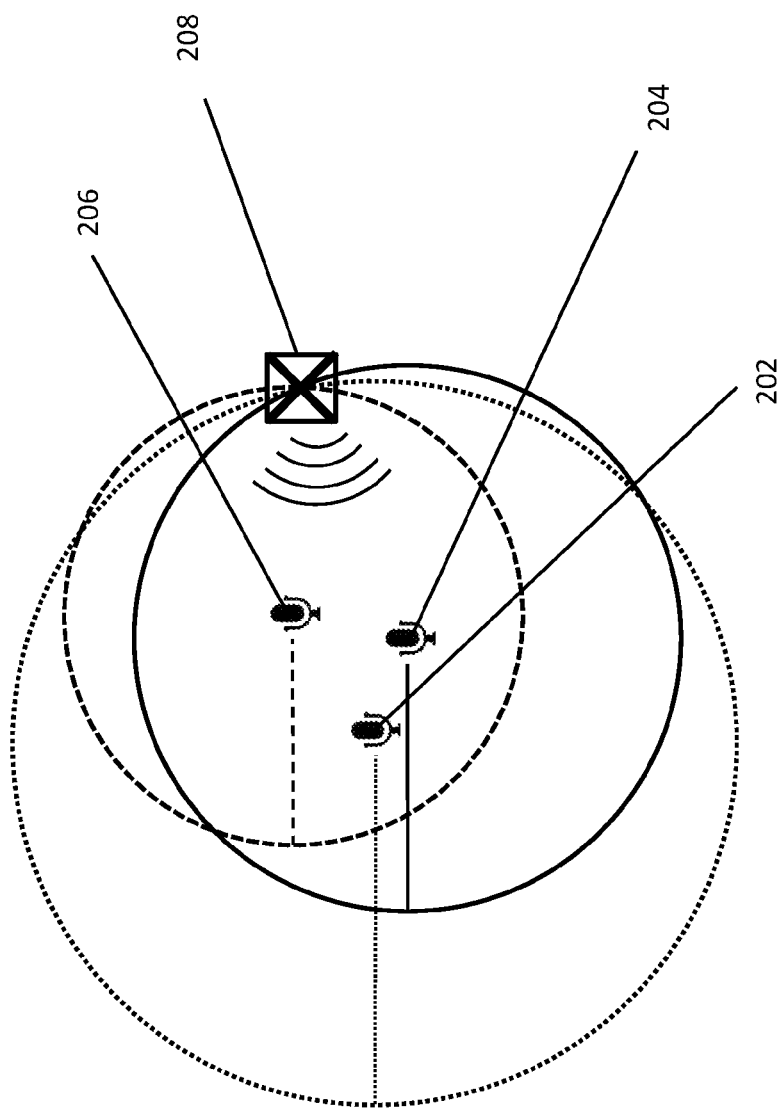
FIG. 2 is a schematic diagram illustrating a simplified trilateration positioning technique.

Once the distances from each of the microphones to the source have been determined, simple algebraic manipulation using these distances along with the positions of the microphones is then all that is required to determine the location of the sound source. FIG. 2 is a simplified diagram demonstrating this process in two-dimensions, although the theory is equally applicable to a full 3D implementation.

FIG. 2 shows the positions of three microphones 202, 204, 206 that make up a microphone array similar to that illustrated in FIG. 1. A sound source 208 produces sound which is captured by the three microphones 202, 204, 206 as well as a closely positioned local microphone (not shown). Using a method similar to that described above, the distance from each of the three microphones 202, 204, 206 to the sound source is determined. Each of the determined distances defines the radius of a circle, centred on the corresponding microphone, on which the sound source lies. The position of the sound source 208 may be determined by identifying the point at which the three circles coincide.

A second approach for determining the location of a sound source is now described. A microphone array, comprising a plurality of microphones, outputs a set of ambisonic A-format signals, each including sound from a sound source. The A-format signals are processed to produce a set of ambisonic B-format signals, comprising the sound field of the room decomposed into Spherical Harmonics. Each of the B-format signals is labelled $b_n^m(t)$, with m and n labelling the spherical harmonic function. In preferable examples the ambisonic microphone outputs four signals, corresponding to the n=m=0 and n=1 m=−1,0,1 cases. This is conceptually equivalent to A-format signals emanating from an omnidirectional microphone (n=m=1) coincident with 3 orthogonally positioned figure-of-eight microphones (n=1 m=−1,0, 1). In other examples higher order spherical harmonics may be used (increasing the number of B-format signals).

As before, a local microphone captures a local microphone signal $s_s(t)$ which corresponds to sound from the sound source.

Once again I uncorrelated sound sources $s_i$ are modelled in a room with reflective walls. The resulting ambisonic B-format signals in this case can be written as:

$$b_n^m(t) = \sum_{i=1}^{I} s_i(t) \times h_i(t, \theta_i(t), \phi_i(t)) \times Y_n^m(\theta_i(t), \phi_i(t)) + n_n^m(t),$$

where $h_i$ is the room impulse response, $Y_n^m$ are the spherical harmonics and $n_n^m$ represents noise.

The room impulse response, $h_i$, is assumed to consist of L delayed reflections such that:

$$h_i(t, \theta_i(t), \phi_i(t)) = \sum_{l=1}^{L} h_{i,l} \delta(t - \Delta t_l).$$

The Fourier transform of the B-format signals can therefore be written as:

$$B_n^m(k) = \sum_{i=1}^{I} S_i(k) \sum_{l=1}^{L} H_{i,l}(k) Y_n^m(\theta_{i,l}, \phi_{i,l}) + N_n^m(k).$$

The cross spectrum between the B-format signal $B_n^m(k)$ and the microphone signal $S_s(k)$, subject to positioning is calculated:

$$E\{B_n^m(k)S_s(k)^*\} = E\left\{\sum_{i=1}^{I} S_i(k)S_s(k)^* \sum_{l=1}^{L} H_{i,l}(k) Y_n^m(\theta_{i,l}, \phi_{i,l}) + N_n^m(k)\right\} =$$

$$E\{S_s(k)S_s(k)^*\} \sum_{l=1}^{L} H_{s,l}(k) Y_n^m(\theta_{i,l}, \phi_{i,l})$$

Performing an inverse Fourier transform on the cross spectrum produces the ambisonic B-format representation (i.e. decomposed into spherical harmonics) of the room impulse response for the microphone signal convolved with the estimated autocorrelation function for the s'th source, $$R_{ss}(n) = IDFT(E\{S_s(k)S_s(k)^*\}) = \sum_{n=0}^{N-1} E\{S_s(k)S_s(k)^*\} e^{\frac{i2\pi kn}{N}}:$$

$$IDFT(E\{B_n^m(k)S_s(k)^*\}) = R_{ss}(n) * \sum_{l=1}^{L} h_{s,l} \delta\left(\frac{n}{F_s} - \Delta t_{s,l}\right) Y_n^m(\theta_{s,l}, \phi_{s,l}).$$

The truncated summation of this ambisonic representation extracts the truncated sum of the direct sound autocorrelation (i.e. excluding any reflections), weighted by the spherical harmonics corresponding to the azimuth and elevation of the source:

$$ds_n^m(s) = \sum_{n=\Delta t_{s,1}F_s - L}^{\Delta t_{s,1}F_s + L} IDFT(E\{B_n^m(k)S_s(k)^*\}) = Y_n^m(\theta_{s,1}, \phi_{s,1}) h_{s,1} \sum_{n=-L}^{L} R_{ss}(n) +$$

$$\sum_{n=\Delta t_{s,1}F_s - L}^{\Delta t_{s,1}F_s + L} R_{ss}(n) * \sum_{l=1}^{L} h_{s,l} \delta\left(\frac{n}{F_s} - \Delta t_{s,l}\right) Y_n^m(\theta_{s,l}, \phi_{s,l}) \approx$$

$$Y_n^m(\theta_{s,1}, \phi_{s,1}) h_{s,1} \sum_{n=-L}^{L} R_{ss}(n)$$

The truncation limit component $\Delta t_{s,1}$ can be extracted in the same manner as for the A-format signals; by employing the PHAT algorithm on the local microphone signal and $b_0^0(t)$ (the omnidirectional B-format component). L is assumed to be smaller than $$\frac{\Delta t_{s,2} - \Delta t_{s,1}}{2} F_s$$

and chosen so that $\Sigma_{n=0}^{L} R_{ss}(n) \gg \Sigma_{n=L+1}^{N} R_{ss}(n)$.

The source direction (azimuth and elevation) relative the ambisonic microphone can be extracted by evaluating the components of $ds_n^m$ as below:

$$\begin{bmatrix} Y_1^{-1}(\theta, \phi) \\ Y_1^0(\theta, \phi) \\ Y_1^1(\theta, \phi) \end{bmatrix} =$$

$$C \begin{bmatrix} \sin(\phi)\cos(\theta) \\ \sin(\theta) \\ \cos(\phi)\cos(\theta) \end{bmatrix} \therefore \phi_{s,1} = \begin{cases} \tan^{-1}\left[\frac{ds_1^{-1}(s,t)}{ds_1^1(s,t)}\right] & \text{for } ds_1^{-1}(s) \geq 0, \\ \tan^{-1}\left[\frac{ds_1^{-1}(s)}{ds_1^1(s)}\right] - 180° & \text{for } ds_1^{-1}(s) < 0, \end{cases}$$

$$\phi_s = \tan^{-1}\left[\frac{ir_1^0(s,t)}{\sqrt{ir_1^1(s,t)^2 + ir_1^{-1}(s,t)^2}}\right].$$

In order to fully define the position of the sound source, the distance (or range) from the microphone array to the sound source must also be determined. This may be calculated using $r_s = \Delta t_{s,1} c$, where c is the speed of sound.

Figure 3:
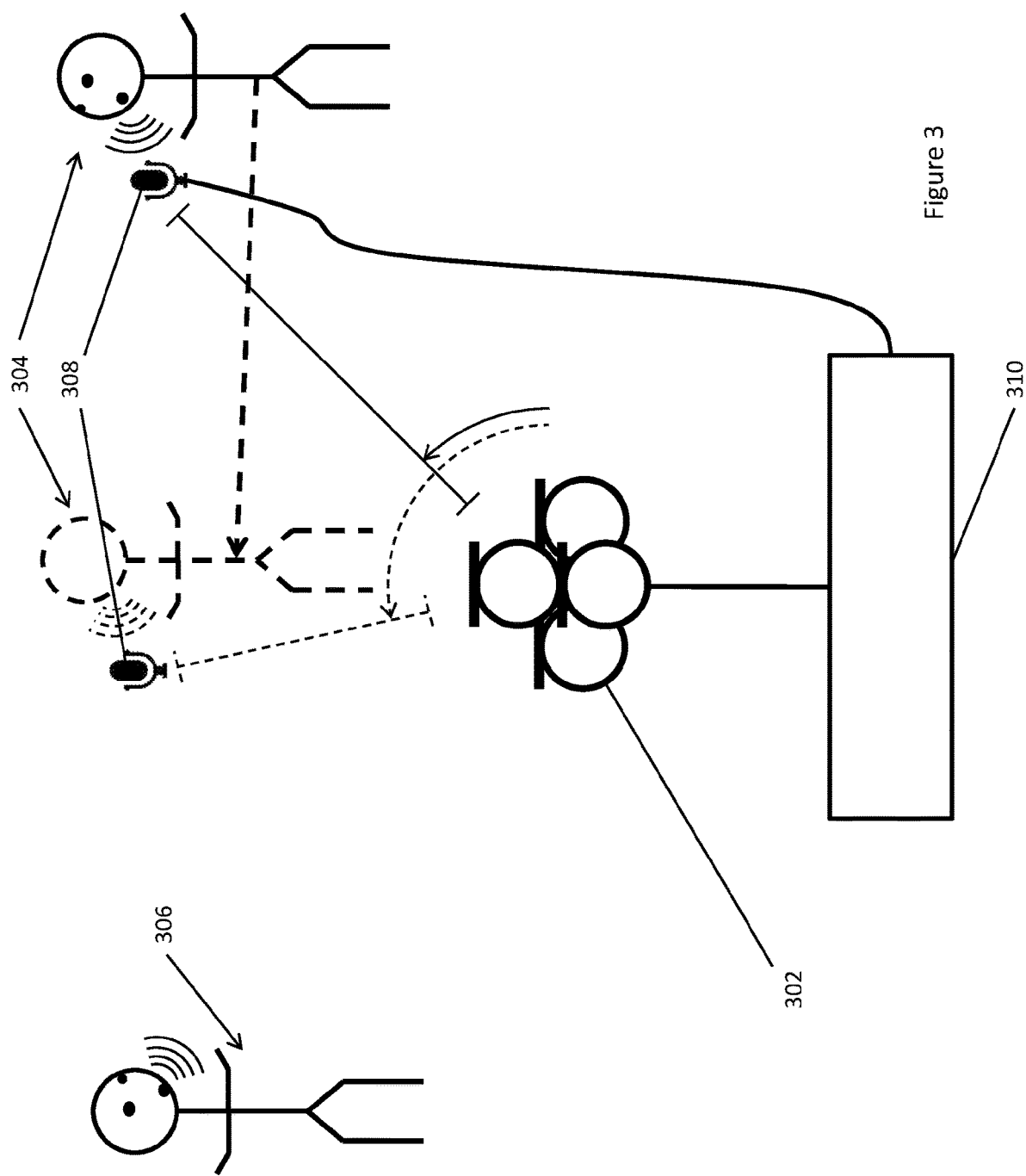
FIG. 3 is a schematic diagram of a sound field recording system operated according to an embodiment of the present invention with a moving source.

FIG. 3 illustrates a scene similar to that shown in FIG. 1, in which a sound-field microphone array 302 and a local microphone 308 are used to record a spatially-encoded sound track comprising sound from both a first person 304 and a second person 306. In contrast to FIG. 1 however, the first person 304 in this scene is moving whilst speaking (illustrated with dotted lines). In prior art systems, determining the position of a moving sound source requires labour-intensive manual tracking, however the techniques described with reference to FIGS. 1 and 2 are fully compatible with moving sources and may therefore be used in this scene to position the first person 4 throughout any movement. The spatially-encoded sound track comprising a high quality local microphone signal may thereby be produced much more easily and quickly.

Figure 4:
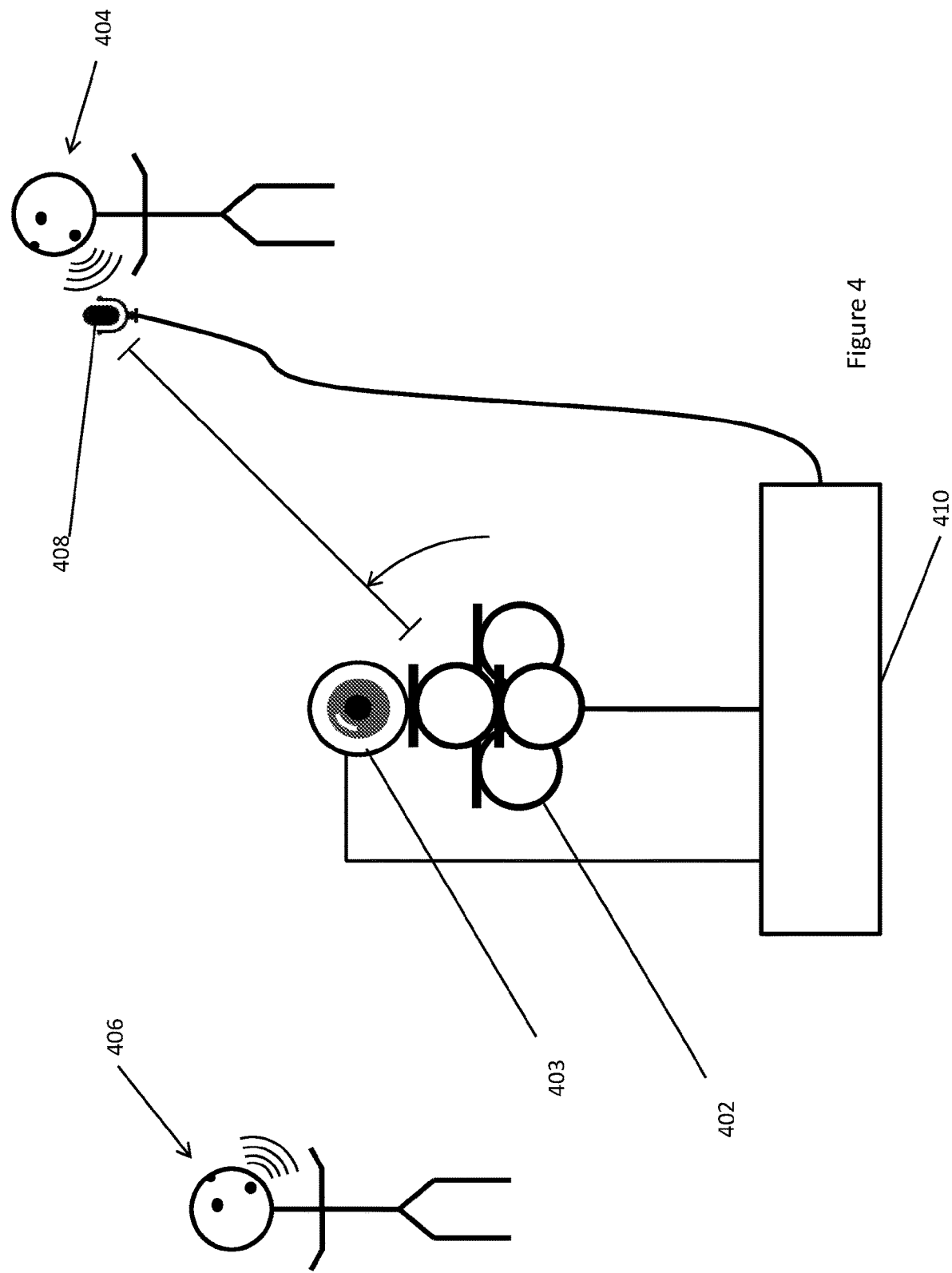
FIG. 4 is a schematic diagram of a virtual reality production system according to an embodiment of the present invention.

FIG. 4 shows a scene from a virtual reality production similar to that shown in FIGS. 1 and 3, in which a sound-field microphone array 402, a local microphone 408 and a processor 410 are used to record a spatially-encoded sound track comprising sound from both a first person 404 and a second person 406. FIG. 4 however, also shows a 360° camera 403, which is operable to capture a 360° video signal containing both the first and second persons 404, 406. The 360° video signal may be played back to a user alongside the spatially-encoded sound track to produce an immersive and accurate VR experience comprising high quality sound from the first person 404 without requiring intensive manual tracking during production.

As mentioned above, the position of the first person 404, determined using methods disclosed herein, may be used for purposes other than facilitating high quality sound both during and after production. For example, the position of the first person 404 may be used to direct movement of the camera 403 and/or adjustments to lighting. The methods disclosed herein may also be enable high quality, immersive and accurate audio-only productions (i.e. with no accompanying 360° video), such as podcasts or musical performances.

The invention claimed is:

1. A method of determining a position of a sound source, comprising:
   generating a spatially encoded sound-field signal using a sound-field microphone system comprising at least two microphones, wherein the spatially encoded sound-field signal comprises a plurality of components, each component including sound from the sound source;
   generating a local microphone signal corresponding to sound from the sound source using a local microphone positioned close to the sound source;
   comparing the local microphone signal with each of the plurality of components to generate a plurality of comparison results; and
   using the plurality of comparison results to determine the position of the sound source relative to the sound-field microphone system;
   wherein comparing the local microphone signal with each of the plurality of components comprises determining respective measures of correlation between the local microphone signal and each of the plurality of components; and
   wherein to determine the position of the sound source relative to the sound-field microphone system comprises:
      using the measures of correlation to determine a direct sound autocorrelation weighted by spherical harmonics; and
      extracting a direction from the sound-field microphone system to the local microphone by evaluating components of the direct sound autocorrelation.

2. The method as claimed in claim 1, comprising using the determined measures of correlation to calculate one or more propagation delays between the local microphone signal and at least one of the plurality of components.

3. The method as claimed in claim 2, wherein using the plurality of comparison results to determine the position of the sound source relative to the sound-field microphone system comprises determining the direction from the sound-field microphone system to the local microphone using differences between two or more of the propagation delays.

4. The method as claimed in claim 2, wherein using the plurality of comparison results to determine the position of the sound source relative to the sound-field microphone system comprises determining a distance, or a change in distance, from the sound-field microphone system to the local microphone using at least one of the propagation delays.

5. The method as claimed in claim 1, wherein the sound source is moving.

6. The method as claimed in claim 1, wherein each of the plurality of components includes sound from a second sound source, and the method further comprises:
   capturing a second microphone signal using a second microphone positioned close to the second sound source, wherein the second microphone signal comprises sound from the second sound source;
   comparing the second microphone signal with each of the plurality of components to generate a plurality of second comparison results; and
   using the plurality of second comparison results to determine the position of the second sound source relative to the sound-field microphone system.

7. The method as claimed in claim 1, further comprising producing a spatially encoded soundtrack wherein the local microphone signal is encoded with the position of the sound source relative to the sound-field microphone system.

8. The method as claimed in claim 1, wherein the method further comprises using the determined position of the sound source to control a further action.

9. A method of determining a position of a sound source, comprising:
generating a spatially encoded sound-field signal using a sound-field microphone system comprising at least two microphones, wherein the spatially encoded sound-field signal comprises a plurality of components, each component including sound from the sound source;
generating a local microphone signal corresponding to sound from the sound source using a local microphone positioned close to the sound source;
comparing the local microphone signal with each of the plurality of components to generate a plurality of comparison results;
using the plurality of comparison results to determine the position of the sound source relative to the sound-field microphone system;
capturing a video signal using a camera system, wherein the sound source is captured within the video signal; and
using optical image tracking techniques to align the spatially encoded sound-field signal and the video signal.

10. The method as claimed in claim 9, wherein the sound-field microphone system is collocated with the camera system.

11. The method as claimed in claim 9, wherein the method further comprises using optical image tracking techniques with the video signal to refine the position of the sound source.

12. The method as claimed in claim 1, wherein the sound-field microphone system comprises at least four microphones.

13. The method as claimed in claim 1, wherein the sound-field microphone system comprises a microphone array and an encoder.

14. The method as claimed in claim 1, wherein the spatially encoded sound-field signal comprises an ambisonic B-format signal.

15. The method as claimed in claim 1, wherein the at least two microphones of the sound-field microphone system are adjacent each other.

16. The method as claimed in claim 1, wherein comparing the local microphone signal with each of the plurality of components comprises inputting the local microphone signal and each of the plurality of components to a neural network and receiving the position of the sound source relative to the sound-field microphone system as an output from said neural network.

17. The method as claimed in claim 16, further comprising training said neural network with previously captured local microphone signals, spatially encoded sound-field signals and information regarding sound source positions.

18. A method of determining a position of a sound source, comprising:
providing a spatially encoded sound-field signal comprising a plurality of components, each component including sound from the sound source;
providing a local microphone signal corresponding to sound from the sound source;
comparing the local microphone signal with each of the plurality of components to generate a plurality of comparison results;
using the plurality of comparison results to determine the position of the sound source;
wherein comparing the local microphone signal with each of the plurality of components comprises determining respective measures of correlation between the local microphone signal and each of the plurality of components; and
wherein to determine the position of the sound source comprises:
using the measures of correlation to determine a direct sound autocorrelation weighted by spherical harmonics; and
extracting a direction from the plurality of components to the local microphone by evaluating components of the direct sound autocorrelation.

19. A computer software tool configured to:
receive a spatially encoded sound-field signal comprising a plurality of components, each component including sound from a sound source;
receive a local microphone signal corresponding to sound from the sound source;
compare the local microphone signal with each of the plurality of components to generate a plurality of comparison results;
use the plurality of comparison results to determine a position of the sound source;
wherein comparing the local microphone signal with each of the plurality of components comprises determining respective measures of correlation between the local microphone signal and each of the plurality of components; and
wherein to determine the position of the sound source comprises:
using the measures of correlation to determine a direct sound autocorrelation weighted by spherical harmonics; and
extracting a direction from the plurality of components to the local microphone by evaluating components of the direct sound autocorrelation.

20. A sound source positioning system, comprising:
a sound-field microphone system which is arranged to output a sound-field signal comprising a plurality of components, each component including sound from a sound source;
a close microphone which is positioned close to the sound source and is arranged to output a close microphone signal corresponding to sound from the sound source; and
a processor arranged to receive the close microphone signal and the sound-field signal;
wherein the processor is configured to compare the close microphone signal with each of the plurality of components to generate a plurality of comparison results and to use the plurality of comparison results to determine a position of the sound source relative to the sound-field microphone system;
wherein to compare the close microphone signal with each of the plurality of components comprises to determine respective measures of correlation between the close microphone signal and each of the plurality of components; and
wherein to determine the position of the sound source relative to the sound-field microphone system comprises:
to use the measures of correlation to determine a direct sound autocorrelation weighted by spherical harmonics; and to extract a direction from the sound-field microphone system to the close microphone by evaluating components of the direct sound autocorrelation.

\* \* \* \* \*